Sept. 17, 1968　　　　　J. L. FELDER　　　　　3,402,229
PROCESS FOR MANUFACTURING STRUCTURAL MATERIAL
Filed July 29, 1965　　　　　　　　　　　　4 Sheets-Sheet 3

INVENTOR.
J. LAWSON FELDER
BY *Sheridan and Ross*

ATTORNEYS

United States Patent Office 3,402,229
Patented Sept. 17, 1968

3,402,229
PROCESS FOR MANUFACTURING
STRUCTURAL MATERIAL
John Lawson Felder, 207 Luther Drive,
San Antonio, Tex. 78212
Filed July 29, 1965, Ser. No. 475,766
9 Claims. (Cl. 264—60)

ABSTRACT OF THE DISCLOSURE

A method of making ceramic products, such as, aggregate, brick, tile, etc., from siliceous raw materials which method comprises heating the particulate raw material in a rotating kiln until it becomes tacky while tumbling it to form it into a cylindrical mass, coating the cylindrical mass with a particulate refractory material, such as sand, having a liquid fusion temperature above that of the raw material, and heating the coated mass to the liquid fusion temperature of the raw material while rolling it to form a cylindrical product; the coating of refractory material preventing the raw material at its liquid fusion temperature from sticking to the walls of the kiln so that the advantages of firing the raw material in a kiln at its liquid fusion temperature can be obtained, as well as a fired product having a refractory coating thereon.

---

This invention relates to a method for forming products from naturally occuring mineral-like materials, more particularly, it relates to a method for converting argillaceous, igneous, igneous-like and slag and other siliceous raw materials into commercial end products.

It is well known that structural elements, such as, building blocks, tiles, etc., can be formed from argillaceous, igneous, and igneous-like slag materials existing in nature by various methods. For example, one of the oldest processes for making bricks from clay-like material is to add water to the raw material, form the brick, dry it and then fire it.

As a further example, a number of improvement methods are known for making products from argillaceous materials which methods are directed to heating the material to a point just below its wet fusion point and then molding it under pressure, this procedure being an expedient to avoid the disadvantage of heating the material to the point of wet fusion in the kiln with resultant sticking of the material to the walls of the kiln. Such prior art practices are represented by those disclosed in U.S. Patents 1,809,215 and 3,050,812. The methods used by the prior art for treating siliceous materials, such as, argillaceous, igneous, igneous-like and slag materials, are subject to a number of disadvantages.

As used herein in this specification and the claims the term "primary" material means argillaceous, igneous, igneous-like slag materials and other siliceous materials. The term "log" as used herein refers to the intermediate product into which the primary material is formed as the final step before it leaves the kiln and from which the final end products are made by forging, molding or by other forming techniques. The term "point of incipient fusion" means the point just below which the primary material becomes slightly wetted on the outside surfaces of the particles. The term "wet fusion" means the point at which the particles of primary material begin to become wetted on their outer surfaces and will vary depending upon the rate of heating and other factors, but it can be accurately observed for a given material and heating rate. The term "liquid fusion" means the point at which the primary material or the refractory parting material becomes plastic throughout. As the term "coating" is used herein it does not necessarily mean a continuous coating but includes a noncontinuous coating.

The processes and apparatuses referred to above leave much to be desired for the satisfactory treatment of argillaceous materials and they can be used only with difficulty for the satisfactory treatment of igneous and slag materials.

It is well known that when primary materials as defined above are heated to their wet fusion temperature or above they can be formed into the required products by molding and other techniques. It is not practical to heat the primary material in conventional rotary kilns until it becomes liquified because it will stick to the walls of the kiln, molds and other equipment, creating difficult and costly handling problems. Further, the excesive time and fuel required in carrying out the heating operation at higher temperatures is prohibitive. Consequently, in the prior art processes it has been common practice to heat the primary material in the kiln only to a point where a portion of it fuses, i.e., the point of incipient fusion, and then carry out the forming operation after removal of the heated material from the kiln. This, of course, results in a sacrifice of quality of the product in that it cannot be readily formed into the required shape, and the formed product is not of uniform density.

Since the primary material cannot be heated in the kiln to the point of wet fusion or above, various expedients have been used to treat the partially fused material after leaving the kiln to make it more susceptible of molding into a product of uniform density. Such a process is disclosed in my U.S. Patent 3,050,812 in which argillaceous material heated to a bloated condition below the temperature of wet fusion is discharged into a mold maintained at a temperature below the temperature of liquid fusion of the material and pressure applied to the mold with the gasses confined therein until the material is all converted into a fused condition so that it conforms with the mold.

Restriction to the upper temperature limit of the prior art results in a percentage of unfired material in the product. Furthermore, in the case of argillaceous material having contained gasses therein or gas containing material, any rapid heating to the specified upper temperature limitations prevents the entire aggregate of individual granules from becoming fully bloated for the provision of lightweight-high strength products. The reason for this is that the granules do not bloat until the material becomes somewhat pyroplastic and the temperature range from the beginning of bloating to the beginning of stickiness is usually on the order of 50° to 100° F. This short bloating range, and consequent limited time, makes it impossible to subject every granule to the same amount of heating, with the result that conventional construction aggregate contains granules at all stages of bloating. If the material is not completely bloated before it is molded or otherwise formed, deformation of the finished product results. It is well known that if raw uncoated primary material, and particularly argillaceous material, is heated to the point of liquid fusion and then molded, the individual granules lose their identity with consequent loss of strength in the finished product. It is also well established that when the uncoated primary materials, and particularly argillaceous materials, are heated to the point of liquid fusion according to conventional methods and in conventional kilns, essentially all of the gasses of bloating escape from the liquid mass with consequent formation of a heavy dense product.

Heretofore it has not been possible to forge agglomerated granules of primary material at the upper temperature limit used in conventional construction aggregate practice, i.e., at the point of incipient fusion. For example, if such a mass is struck a sharp blow with a cool hammer, the mass shatters rather than forging into the desired shape.

Prior art processes for the manufacture of lightweight construction aggregate have been subject to the disadvantage of waste resulting from too many fines. Another difficulty has been the impossibility of producing sound aggregate in consistent amounts above one inch in diameter.

There is a need in the construction industry for an aggregate brick which floats and is of structural ceramic quality. To produce such a brick in the past it has been necessary to add chemical agents for the production of gas, to the wet mix before it hardens. This results in a high cost product and one which does not have the required structural quality.

Conventional methods for firing argillaceous materials require 30 hours or more of firing in conventional kilns. This would be a prohibitive time for firing igneous and igneous-like slags as these materials are subject to significant loss in greenware strength over a 30 hour cycle of rise and fall of the kiln temperature even though the upper temperature is present for only a short period of time. For example, at several hundred degrees F. below the temperature at which the individual granules of these type materials become adhesive enough to stick together to form a product, the "dry" granules become soft and the softness increases to a degree of plasticity where an 8 inch brick supported like a beam with supports 7 inches apart will sag one inch during a two hour rise and fall temperature cycle. This is prohibitive to the formation of a product of required dimensions. There are no prior art methods for producing a dense product from igneous and igneous-like slag materials by forging or molding which is virtually gas free and has high strength, high-density characteristics. Thirty hours' firing time would also be prohibitive for economic reasons.

Rebloating has been a serious problem of the prior art in products made from argillaceous materials, and from igneous and igneous-like slag materials containing gases or gas forming materials, as the prior art methods, restricted as they are by time and temperature limitations, do not insure complete boating during the firing stage.

In the past, the coloring of the fired product to provide a ceramic glaze to the surface has been a separate and individual step apart from the firing and forming steps. This, in addition to the technical difficulties involved, has prevented the wide spread production and use of color-glaze products.

It is an object of this invention to provide a method for firing primary material inside the kiln at least up to its liquid fusion temperature without sticking to convert it into a log or intermediate product which can be readily formed into a final product and which can be heated higher than the liquid fusion temperature of the material itself with beneficial results.

It is another object of this invention to provide a method for firing primary material at its liquid fusion temperature in a kiln and converting it into a finished product without the use of pressures and confined gases in the mold or other forming equipment to convert the material to the liquid fusion state.

It is another object of this invention to provide a method as stated which produces a final product containing substantially no unfired primary material.

It is another object of this invention to provide a method for firing gas-containing primary material, and particularly argillaceous material, in which complete bloating of the material is effected during the firing step and no rebloating occurs in the forming step.

It is another object of this invention to provide a method as stated in which substantially all of the gases of bloating are retained in the final product.

It is another object of this invention to provide a method for firing primary material which is applicable to igneous and igneous-like slag materials as well as to argillaceous materials.

It is another object of this invention to provide a method for firing primary materials which produces an intermediate product which can be forged or otherwise formed into a final product.

It is another object of this invention to provide a method as stated which provides a final product in which substantially all of the individual particles of material retain their identity.

It is another object of this invention to provide a method as stated in which fines are agglomerated into the product and by which appreciable amounts of sound aggregate of large size can be produced.

It is another object of this invention to provide a method for firing argillaceous and other gas-containing materials by which a final product can be produced which floats on water.

It is another object of this invention to provide a method for firing igneous and igneous-like slag materials in which there is no significant loss of greenware strength of the material.

It is another object of this invention to provide a method for firing primary materials in which a color-glazing step can be incorporated to provide a final product having a glaze or other desired color effect.

It is a further object of this invention to provide a method for firing primary materials which can be conducted in a comparatively short time without the use of excessively high temperatures.

The method of the invention broadly comprises heating primary material in a kiln during tumbling to its wet fusion temperature, coating it with a particulate refractory material having a liquid fusion temperature about 150° F., or more, above that of the primary material, heating the coated primary material above its wet fusion temperature and ordinarily to its liquid fusion temperature, removing it from the kiln and forming it into a finished product by forging, and other forming methods. An improvement of the method is the forming of the log of the coated primary material by rolling the agglomerated mass of coated primary material in the kiln between rollers and the internal surface of the kiln. The method of the invention permits heating primary material in a kiln above its incipient fusion point to at least its liquid fusion point without the hot primary material becoming stuck to the walls of the kiln. As set forth herein many advantages other than protection of the kiln wall flow from the method.

The invention will now be described with reference to the accompanying drawings wherein like numerals refer to like parts and in which.

Figures 1, 4, 5:
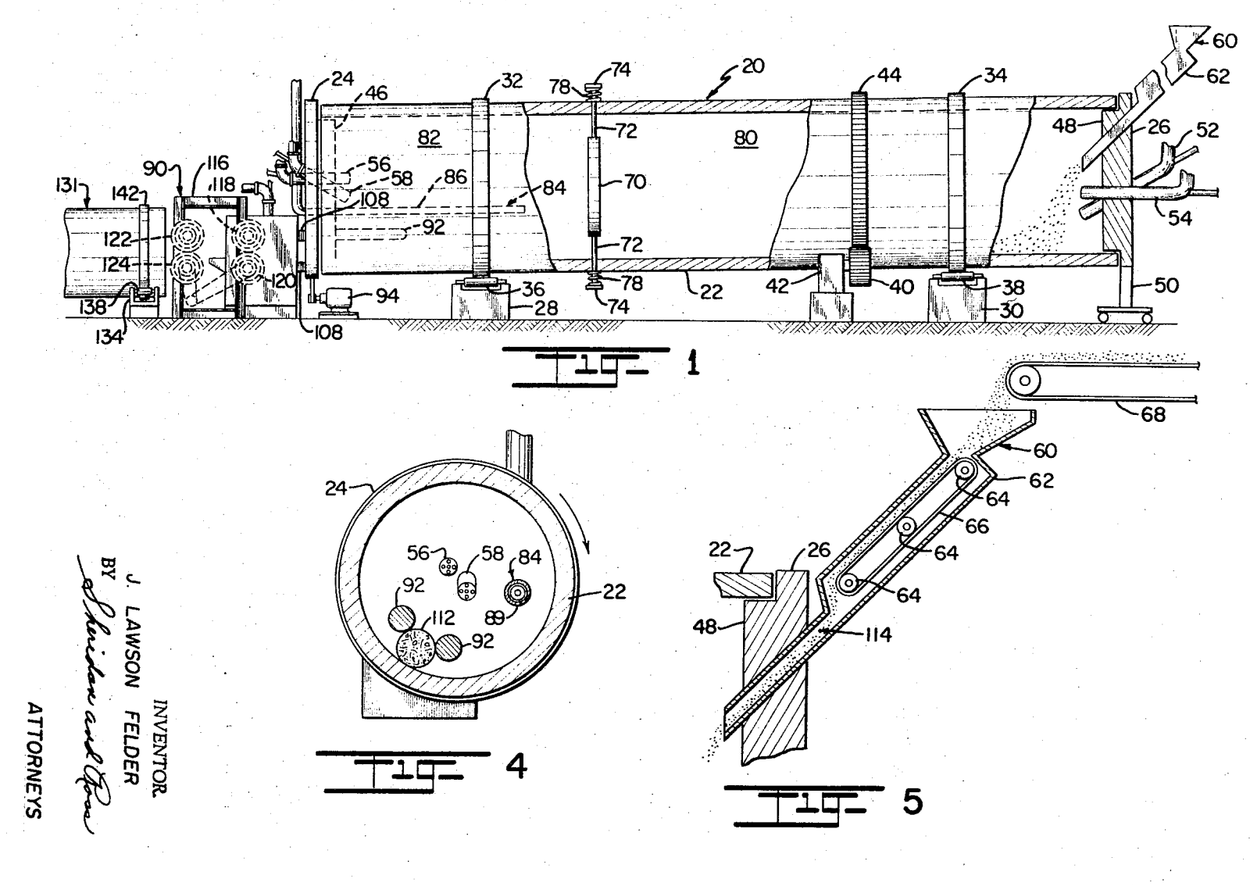
FIG. 1 is a schematic partial sectional view of a kiln for practicing the invention and one type of forming apparatus for the log product.
FIG. 4 is a section taken on line 4—4 of FIG. 2.
FIG. 5 is a partially schematic sectional view of the hopper at the forward or entrance end of the kiln.

Referring to FIG. 1, the kiln 20 shown therein comprises cylindrical steel shell 22 and stationary hoods 24 and 26 closing the ends of the shell. The shell is mounted for rotation on blocks 28 and 30 by means of ring tires 32 and 34 on shell 22 and rollers 36 and 38 mounted in the trunion shaped ends of blocks 28 and 30. The shell 22 is rotated by means of drive pinion 40 driven by power unit 42 and meshing with driven gear 44 mounted on shell 22. The stationary hoods 24 and 26 are constructed with internal circular bosses 46 and 48, respectively, onto which the ends of the steel shell fit loosely for rotation. This structure permits rotation of the shell independently of the stationary end hoods and requires that any gas passing between the shell and the exterior, or vice versa, must travel through a 90° angle. Hoods 24 and 26 are mounted on individual supports as shown at 50 for end 26.

The kiln 20 is slightly inclined as shown with the left end in the figure being the lower end and the right end being the upper end. The purpose of the inclination is to provide for travel of primary material being fired, from the upper end to the lower end as the shell 22 is rotated. The upper end is the entrance end for raw material and the lower end is the exit end for raw material. The lower end is the entrance end for any air which enters the kiln and the upper end is the exit end for combustion gas byproducts.

The upper end is provided with burners represented schematically at 52 and 54 and the lower end is provided with burners represented schematically at 56 and 58. The entrance end is provided with hopper 60 mounted at an angle in stationary hood 26 for introduction of raw material into the interior of the kiln. As shown in the schematic cross section of FIG. 5, the feed hopper 60 includes the outer case 62 in which is mounted the rollers or pulleys 64 over which wire mesh feed belt 66 is rotatably mounted. It will be seen that this construction permits the flow of exhaust gases from the shell up through the feed hopper 60 as raw material is being fed by outer feed belt 68 into the hopper.

A central partition or insulation refractory disc 70 is mounted in the left half of steel shell 22 by means of circumferentially spaced support spokes 72 provided with heads 74, and springs 78 mounted between the heads 74 and the outer surface of the steel shell 22. As will be more fully explained later, the partition 70 divides the steel shell into a preliminary heating area 80 and a final firing area 82.

Figure 2:
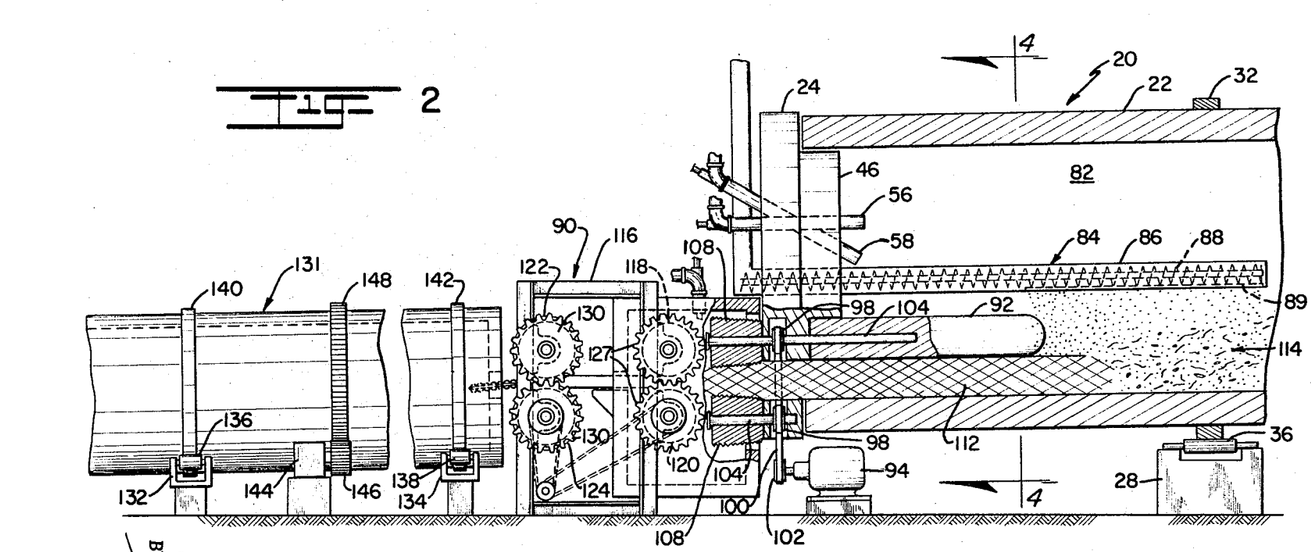
FIG. 2 is a schematic partial sectional view of the discharge section of the kiln of FIG. 1, and apparatus for forming the log into aggregate balls, the figure showing the removal rollers for the log and other structural details.
Figure 3:
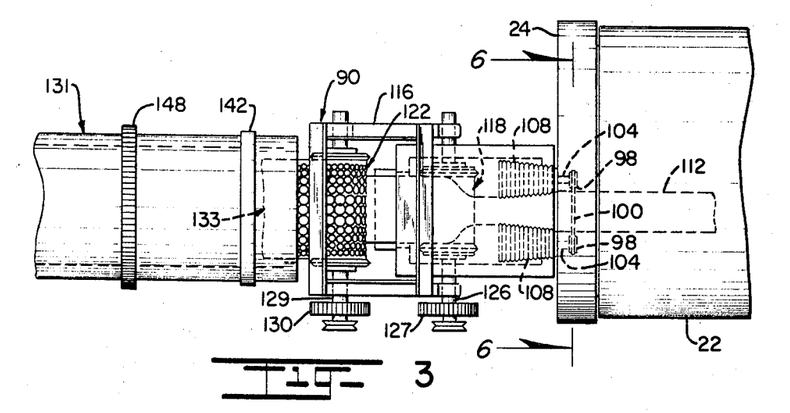
FIG. 3 is a partially schematic sectional plan view of the forming roller die apparatus used to form the log into aggregate balls.

For introducing finely divided refractory material into the interior of the kiln and distributing it over a significant area of the interior thereof, there is provided screw conveyor 84 comprising outer tube 86 and the screw feeder 88 as more particularly shown in FIG. 2. The outer tube 86 is provided with a slot 89 in its bottom for the distribution of particulate material on the inner wall of shell 22.

Equipment for forming the fired product or log after it leaves the kiln 20 is represented schematically at 90. This forming equipment may take the form of molds, forging machinery, panel forming machinery, tube forming machinery, and other type forming machinery dictated by the type of end product required.

Referring now to FIG. 2 for a more detailed showing of the construction of the exit end of the kiln and a specific type of forming machinery, a plurality of hot rollers 92 are mounted to extend through a hole in stationary hood 24 into the interior of firing area 82. These rollers, two in this modification, are powered by power unit 94 through gears 98 and chain drive belt 100 driven by driving gear 102. Driven gears 98 are attached to hollow spindles or shafts 104 mounted centrally of hot rollers 92, and angled refractory thrust rollers 108. The shafts 104 are internally cooled to control the temperature of the rollers 92. The thrust rollers 108 are by this construction driven simultaneously with rollers 92. It will be seen that the rollers 92 are operated independently of the rotation of the steel shell 22. The purpose of the rollers 92 is to roll the log 112 of agglomerated fired primary material 114 into cylindrical form. As the steel shell 20 and the rollers 92 rotate independently of each other the log 112 is squeezed between the rollers and the interior surface of the shell into a cylindrical form. Refractory thrust rollers 108 are provided with screw threads on their angled exterior surfaces so that they grip the left end of the log 112 and force it out of the kiln.

Figure 6:
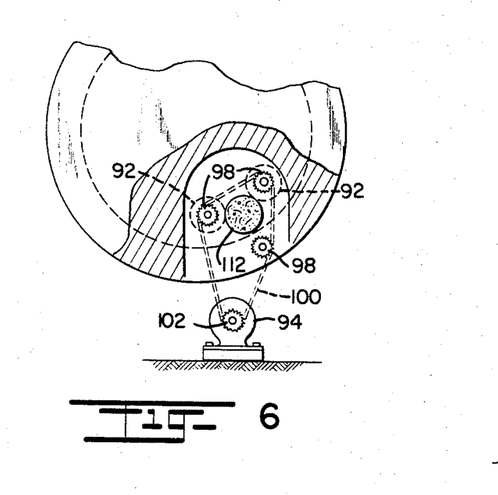
FIG. 6 is a view taken on line 6—6 of FIG. 3.

FIGURES 4 and 6 illustrate the manner in which the hot forming rollers 92 are driven to form the log 112 into a cylindrical shape by being rolled between rollers 92 and the interior surface of shell 22. As stated above, the hot rollers 92 are internally cooled or heated to maintain their outside temperatures the same as the internal temperature of the firing area 82. Thrust rollers 108 are also internally heated or cooled through their hollow shafts 104. These rollers and rollers 92 have refractory surfaces.

The structure of the particular forming device used to illustrate the utility of the kiln and the log product formed by the method of the invention will now be described with reference to FIGS. 2, 3, 7 and 8. The utility of the method of the invention is illustrated by a description of the forging of aggregate balls from the log, but the application of the invention is not limited to the making of this product. The description of the making of aggregate balls from the log is given for the purpose of illustrating the utility of the invention and this illustration is in no way limiting of the products which can be made by use of the invention, as many other products, such as, bricks, paneling, pipes, etc. can be made with the appropriate machinery, from the log produced by the method and apparatus of the invention.

Figure 7:
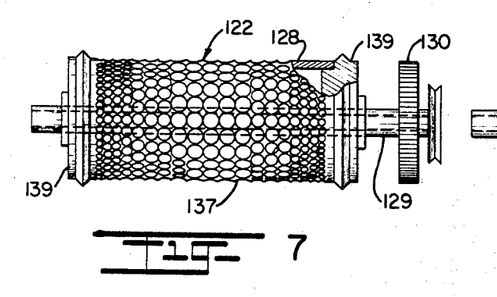
FIG. 7 is a partially schematic top plan view of the forming die roller.
Figure 8:
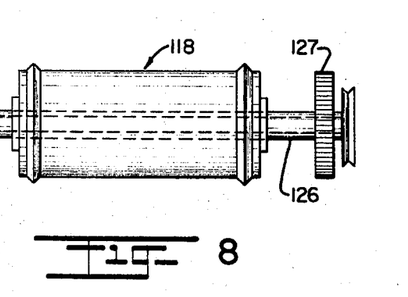
FIG. 8 is a top plan view of one of the hot refractory rollers located forwardly of the forming die roller.
Figure 9:
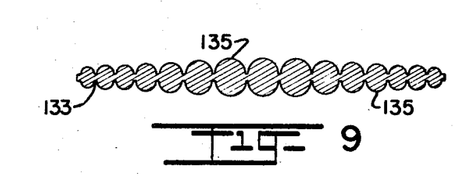
FIG. 9 is a cross sectional view of the product formed from the log by the forming roller dies showing the aggregate balls before they have been separated from the septum.

The ball making machine as shown in FIG. 2 comprises a frame 116 in which is rotatably mounted refractory hot pressing rollers 118 and 120 as well as forming die rollers 122 and 124. The pressing and die rollers are simultaneously driven by a power means (not shown) through a series connecting power belts as shown. A plan view of one of the refractory hot rollers is shown in FIG. 8, this roller being provided with a hollow shaft 126 through which heat or cool air may be introduced into the roller to control its surface temperature. Driven gear 127 is mounted on shaft 126. As shown in FIG. 7, the forming die rollers are provided with a pressed-on die sleeve 128 comprised of semicircular die cups 137. As shown, the cups at the end are of smaller diameter than those in the center. Die sleeves are mounted on two rollers 139 as shown and the rollers are mounted a small distance apart so that as the hot log passes between the rollers a septum 133 connecting complete balls 135 is formed. A cross section of this septum taken in a longitudinal direction is shown in FIG. 9. This shaft 129 of die rollers 122, 124 is attached to drive gear 130.

For the purpose of breaking the aggregate balls from the septum, a rotating annealing drum 131 is mounted adjacent the end of the ball forming machinery 90 to receive the product emerging from the forming die rollers 122 and 124. The annealing drum is mounted to rotate on trunions 132 and 134 by means or trunion rollers 136 and 138 and tires 140 and 142 attached to the annealing drum. The drum is rotated by power unit 144 through drive pinion 146 and driven gear 148. It is preferably provided with segregating apparatus, such as screens of various mesh sizes, for segregating the balls and particles into various sized lots.

Broadly described, the operation of the kiln and the performance of the method of the invention are as follows. Raw primary material comprising either argillaceous, igneous or igneous-slag materials, or mixtures thereof, is introduced into hopper 60 to flow into the primary heating zone 80 which is heated by the burners 52 and 54. As the slightly inclined (5°–15°) steel shell 22 rotates, the primary material eventually passes into final firing zone 82. Fine sand or other type refractory material in introduced into the firing zone 82 by means of screw conveyor 84 and it is distributed on the inner surface of the refractory lining of the steel shell in the path of the primary material to coat it as it agglomerates. The temperature of the final heating zone is then raised to a point of about 200° F. above the fusion temperature of the primary material and maintained at this temperature. As the primary material agglomerates into balls it passes under the rollers 92 which are rotating independently of the rotating shell. The rollers squeeze the agglomerated primary material between their outer surfaces and the inner surface of the shell thus rotating the agglomerated primary material and forming it into a clyindrical log. The left end of the log is contacted by thrust rollers 108 and is gradually pulled out of the kiln in the form of a finished product available for further processing into the desired commercial item.

One utilization of the finished product is in the making of balls used for various applications. The finished product is forced between refractory hot pressing rollers 118 and 120 where it is flattened into a sheet susceptible of entering forming die rollers 122 and 124. The die rollers form the flattened log into a sheet of balls connected by a septum as shown in FIGURE 9 and this product passes into the rotating annealing drum 131 where the balls are broken loose from the septum and separated from fines and other particles. The temperature of the emerging log can be controlled as required from the time it emerges from the kiln until forming of a product, by controlling the temperature of rollers 108, 118 and 120.

The shell 22 is provided with seals on the inner surface of its ends which rotate with the shell and prevent the entry into the kiln of excess air. This results in a substantially closed kiln with the exception of the hole in the stationary hood 24 at the lower end where the hot log emerges and the raw material input chute 60 at the entrance end where the exhaust gases emerge. It is to be noted that this kiln does not use a smokestack. The input chute or hopper 60 is constructed so that the hot exhaust gases pass along a chamber under the woven wire input conveyor or feed belt 66. As the gas travels this path its velocity drops to a very low value so that "blow fines" are dropped out in accordance with the principle of the cyclone separator. This construction permits utilization of heat emitted from the exhaust gases, as it is used to heat incoming raw material contacted by the gases. The kiln is ordinarily lined with approximately a nine inch thickness of semi-insulation refractory brick, although the type of lining is optional.

The refractory disc or partition 70 separates the kiln into two heating zones. The first approximate two-thirds of the kiln length is a preheating zone where approximately 90 percent of heat utilization occurs. The other approximate one-third of the kiln length comprises the final heating zone, the temperature in this zone being ordinarily maintained from about 100° to 200° F. higher than that of the preheating zone 80.

The refractory disc can be supported independently of the kiln so that it remains stationary or it can be fixed with respect to the kiln so that it rotates with it. In the disclosed modification, the disc rotates with the kiln and is supported on four circumferentially spaced legs thus leaving space for incipient heated raw material to pass between its outer periphery and the inner periphery of the shell 22.

The internal partition 70 functions to permit a shorter kiln than conventionally used and it also functions to convert the firing zone 82 of the kiln between it and the burners in the lower end into a radiant burner housing that is almost independent of the rest of the kiln. When the raw material passes from the preliminary heating zone 80 into the higher temperature zone 82 it is "shocked" by the abrupt change in temperature and absorbs heat more rapidly than it does in the conventional kiln with no partition where the temperature change is gradual. The advantage of the use of partitions is that they provide areas along a kiln of conventional low heat absorption rate with areas providing abrupt increase in heat absorption at chosen locations, depending upon the location of the partition discs. This results in reduced length of the kiln and permits selection of optimum locations for different rates of heat absorption.

The construction of the internal disc partition 70 may take various forms, for example, it may be provided with holes to permit the passage of certain amounts of radiant heat to provide for more gradual temperature change on both sides of the disc. The holes may be baffled at an angle to permit passage of the gases without significant transfer of radiation.

The thermal "shocking" of the incipient heated raw material traveling from the primary heating zone 80 by the abrupt change in temperature as it enters zone 82 agglomerates it into an indefinite-shaped chunky mass that would eventually form a log if allowed to roll by the force of gravity in the kiln for five or ten minutes. The hinged-spring-loaded power rollers 92 mechanically force the indefinite mass into a cylindrical log of predetermined diameter. The partition disc saves at least one-third additional length of the kiln that would be required with the gradual graduation of heat distribution along the kiln by providing for an abrupt temperature change that "shocks" the raw material into agglomerating quickly. The power rollers 92 save an additional one-third length of the kiln that would be required if the log were left to naturally form in time through rolling by gravity as the kiln rotates.

The granular refractory powder, ordinarily sand, is distributed continuously by means of the screw conveyor 84 on the kiln lining in the path of travel of the primary raw material. It is not dropped on the log or the rollers 92 but on the kiln surface and the log picks it up from the surface and transfers it to the rollers. The refractory granular material, which might be referred to as "parting" material, being distributed on the kiln lining functions to keep the lining clean and prevent sticking of the hot clay to the brick lining. It has been noted that occasionally a piece of primary material, such as clay, will stick to the brick of the kiln lining and within a few minutes the coated log will pick up the stuck piece and incorporate it into the log. This has been tested by running a light color clay and a dark color clay alternately in the making of aggregate balls and it is easy to see the "pick up" of one color clay by the other color clay. The introduction of the sand, or other granulated refractory material, provides a permanent thin layer of sand and primary material coating on the lining brick in the final heating zone 82. When the coating of sand-primary material gets too thick the log picks it up and a new thin coating is laid down. The result is that wear on the refractory brick lining is prevented as the wear is on the sand-primary material coating. This extends the life of the refractory lining of the kiln indefiinitely.

The hollow shafts 104 inside the power rollers 92 are cooled by air forced through the hollow space. The outer refractory surfaces of the rollers 92 are semi-insulated and are continually coated with the granular refractory primary material being introduced into the kiln in the final heat zone 82 by the screw conveyor 84 operating in a high temperature metal tube. In the final heating zone 82, the kiln temperature can be elevated as much as 500° F. above the highest temperature in the primary heating zone. This is the equivalent of adding one-third total length to the kiln.

The thrust rollers 108 convey the log out of the kiln and partially shape or flatten it for easy entrance into the forging or molding section. These rollers can be used to indicate and act as an automatic control for the feed coordination between the speed of the emerging log and the speed of the forming mechanism. They are power driven and are ordinarily maintained at a temperature on their surfaces lower than that of the final heating zone 82 of the kiln, usually 200 to 300 degrees F. lower. High heat is not required for the log at this point and it is only necessary to prevent chilling the log surface too much. After leaving the hot thrust rollers 108 the log is fed into the ball forging machinery or other type forming machinery selected in accordance with the final required product.

It is to be noted that the kiln is almost closed at both ends. The two or more burners at each end operate on forced air and fuel, which may be L.P. gas, natural gas, vaporized fuel oil, powdered coal or lignite, or other. It is to be noted that none of the burners operate on induced air. The mating structure of the stationary hoods at each end with the corresponding ends of the shell 22 requiring escaping flu gases to negotiate a 90° turn prevents any escape of radiation heat. As the kiln is not operated by induced draft, no stacks or induced draft fans are necessary.

In the conventional rotary kiln used in the lightweight aggregate industry both ends are open. The discharge end has an opening below the stationary hood to let the fired aggregate out and the charging end has a stack for induced draft. Actually this amounts to one long stack that is bent in the middle, and large quantities of secondary air are drawn in through the discharge opening, travel through the kiln to mix with the firing atmosphere and give an overall oxidizing atmosphere, then travel up the stack. This illustrates why the thermal efficiency of these kilns is less than 25%.

The rotating kiln described herein is constructed so that no secondary air enters to mix with and cool the kiln atmosphere. This makes control of the flames and heating much easier and more positive. The fact that there is no secondary air inside the kiln raises the thermal efficiency by eliminating absorption of heat into the secondary air and conduction of hot gases out of the stack in large volumes. This means that more Btu's can be introduced into the kiln and shorter kiln length is adequate with consequent reduction in the radiating area and thus reduction in thermal losses. As the wear on the refractory lining is reduced by the granular parting material, a less dense refractory lining is required so that a dual purpose lining, both insulating and having a hard, dense, durable surface, can be used instead of the conventional dense and low insulation refractory lining. All of these factors further increase the thermal efficiency of the kiln.

The huge volume of socondary air pulled into conventional kilns through the discharge opening by the open stack causes very high thermal losses by convection. These convection losses are so great that it is not worthwhile to insulate the walls of the kiln against them. In the closed kiln described herein, which uses only primary air with fuel, heat loss through convection is minor and is further reduced by use of heat from exhaust gases to preheat incoming material. The walls of the kiln are insulated against conduction and the kiln is closed against radiation losses. With these conditons, if the fuel-air mixture is forced into the kiln at a greater velocity than flame propagation, the whole kiln becomes a radiant burner housing, this type of kiln being considered the most efficient heater available.

The use of the internal partition disc to create two separate heating zones is not restricted to the described closed type kiln as it can be used in other type kilns with equally good effects. It can be used in a conventional rotary kiln to convert a section of the kiln into a radiant burner housing even with the discharge opening and the stack. The disc reduces the center-flow volume of secondary air in a rotary kiln because it acts as a baffle to cause resistance to flow of huge volumes of secondary air up the center of the conventional rotary kiln. It acts as a target or reflector to reflect back the radiation into that area between the pressurized air-fuel burner and the partition. This builds up heat in the area and it becomes a radiant burner housing. Also, the closed type kiln is not limited to the use of the partition disc. It is obvious from the described structure of the closed kiln that it is constructed to utilize all heat which would ordinarily be lost in conventional kilns, and can be operated efficiently without the disc. For example, the heat released by the cooling of the log and the cooling of the products is utilized to preheat the air used to mix with the fuel for the burners of the kiln.

The aggregate-ball making machine used to illustrate the utility of the invention is perhaps the simplest of the machinery necessary to convert the finished log into a required end product. The emerging log is fed between the two cylindrical rollers with the result that one-half of each ball is indented into the surface of each roller. The two metal rollers, which are chrome plated steel, are air cooled and almost touch each other. If they contacted each other the aggregate balls formed would remain in one cup of one roller and it would be difficult to remove them. By constructing the device so that the rollers do not touch, a thin web or septum is left attached to the equator of each ball and this web acts as a thin sheet to strip off all the balls from the roller die cups. The result is a thin sheet or septum with one-half the ball diameter showing on each side of the sheet. The slightly cooled (115° F.) sheet is dropped into a tumbler drum 131 where the balls are annealed and are separated by the tumbling action of the balls in the tumbler drum. The thin sheet or septum between the balls breaks up into the "fines" required in all aggregate gradations. The largest cups of the die rollers are in the center and the smaller ones at the edges.

Other machines than the ball forming machine which have been used to make a final product from the log are a brick making machine, a tile making machine, a pipe making machine and others.

The granular refractory powder, referred to as parting material, distributed on the internal surfaces of the kiln by means of the screw conveyor 84 may be any material which has a fusion temperature at least about 150° F.– 200° F. above that of the primary material. Examples of such material are sand, sandy loam, beach sand, granular granite, bauxite, and other high refractory materials. It is an important feature of the invention that the use of the parting material makes it possible to heat the primary material in the kiln several hundred degrees higher than was possible by conventional methods in which the primary material could only be heated to the point at which it becomes sticky, that is, the lower temperature of incipient fusion. This highest temperature of prior art methods is the lower limit of temperature for the present method with respect to any particular primary material.

In the production of bloated aggregate by conventional methods, the raw clay must be heated to a temperature slightly above incipient fusion that is, where the clay softens enough to bloat, and below the wet fusion temperature at which the granules become slightly wet and stick together as a ball and to the kiln surface. This means that the upper temperature limit for conventional methods is dry, incipient fusion temperature that is the temperature just below which there is no fusion wetness. In the present method the dry incipient fusion temperature is too low as fusion wetness is necessary to agglomerate the particles and make a log having the outer tough skin which includes the parting material.

Prior art methods for aggregate production do not use a parting material and accordingly the upper temperature limit of these methods is dry incipient fusion. The lower temperature limit for this method is just above this point. Every material has a different temperature at which the dry incipient fusion becomes slightly wet incipient fusion to cause enough stickiness for the granules to agglomerate into a ball. There are probably materials which will ball up at temperatures as low as 1500° F. The expression "wet fusion temperature" refers to the temperature at which the shallow, initial wetness of the outermost surface of each granule occurs, with the interior of the granule remaining dry. At that point the mass agglomerates into a ball. When the rough ball is coated with a parting material, there is a tendency for the interior of each granule to assume the low viscosity of its outer wet layer with a resulting overall lowering of the general viscosity of the entire mass.

The upper temperature limit at which the method is performed is dictated by the temperature at which the parting material becomes wet, that is, its wet fusion temperature, and by economic considerations. The parting material functions to prevent the sticky primary material in the form of a ball or log from sticking to the kiln surface, and to form a coating on the log to cause lower viscosity of the interior of the log. The coating material is only useful below a temperature at which it becomes to the slightest degree wet or sticky and this temperature must be several hundred degrees above the temperature of wet fusion for the primary material so that the log of the primary material can be heated to its liquid fusion temperature with the outer layer of parting material preventing it from sticking to the kiln surfaces. Accordingly, the absolute upper temperature limit of the method is that just under the point where grains of the most refractory material, zirconia for example, become slightly fusion-wet on their outer surfaces. The absolute lower temperature limit of the method, and accordingly, the lower temperature at which the parting material becomes wet, is about 200° F. higher than the wet fusion temperature of the primary material having the lowest wet fusion temperature.

The upper temperature limit of the method is dictated by the characteristics of the parting material and the lower temperature limit of the process is dictated by the characteristics of the primary material. The parting material must be dry (no fusion wetness) at upper and lower temperature limits of the process as it acts as a parting material to prevent the primary material from sticking to the kiln. The wet fusion temperature of the primary material should be about at least 200° F. lower than that of the parting material so that the primary material will be at the liquid fusion point while the parting material is still dry.

While it is preferable that the wet fusion temperature of the parting material used be about 200° F. higher than that of the primary material with which it is used, the invention is not restricted to this temperature differential as it is operable with some materials at a temperature differential of about 150° F. between the wet fusion temperature of the primary material and the parting material.

Actually, the economics of the situation dictate that the method be performed at the lowest upper temperature limit in order to keep the price of the final product competitive. The higher the operating temperature, the more fuel is used with resultant increase in cost of the finished product. On the other hand, high temperature refractory products sell for a higher price than low temperature refractory products. Variations of the method considered within the scope of the invention include final heating of the coated agglomerate of primary material to points above its liquid fusion temperature and also slightly below this point.

The particle size of the parting material is not critical. The main requirement is that it provide a continuous coating which isolates the hot soft log from the kiln surface and isolates the log from the kiln gases and the kiln atmosphere. The heat in the kiln travels through the thin coating into the log. The composition of the parting material is not critical except that it should be inert and refractory up to the required temperature.

Test results of the method performed on argillaceous, igneous and igneous-like slag materials, as well as products formed by the method, will now be discussed. The composition of the materials used for the test results and products are set forth in the following table.

TABLE 1.—EXAMPLE COMPOSITIONS OF ARGILLACEOUS, IGNEOUS AND IGNEOUS-LIKE SLAG

|  | #1 | #2 | #3 | #4 | #5 | #6 | #7 |
|---|---|---|---|---|---|---|---|
| $SiO_2$ | 59.47 | 57.92 | 55.10 | 59.34 | 70.18 | 48.69 | 40.69 |
| $Al_2O_3$ | 19.64 | 14.40 | 23.80 | 15.71 | 14.47 | 14.00 | 21.70 |
| $Fe_2O_3$ | 4.77 | 3.60 | 3.51 | 5.76 | 3.47 | 13.04 | 20.90 |
| $CaO$ | 4.30 | 6.30 | 3.28 | 3.00 | 1.99 | 9.00 | 9.17 |
| $MgO$ | (¹) | 1.08 | 1.24 | 2.09 | 0.88 | 7.94 | 3.05 |
| $Na_2O_3K_2O$ | 0.24 | 2.70 | 1.31 | 2.00 | 7.59 | 4.79 | 1.25 |
| $TiO_2$ | 1.14 | 1.22 | 1.05 | 1.83 | 0.39 | 2.29 | 2.09 |
| $B_2O_3$ |  |  |  |  |  |  | 0.07 |
| $SO_3$ | 0.55 | 1.34 | (¹) | 2.00 |  |  | 0.67 |
| $CO_2$ | 3.25 | 6.50 | 1.75 | 1.07 |  |  |  |
| $H_2O$ | 5.70 | 4.85 | 6.00 | 7.02 | 0.84 | 0.17 |  |

¹ Tracers.

Compositions 1, 2, and 4 are argillaceous materials, compositions 5 and 6 are igneous materials and composition 7 is an igneous-like slag material. Composition No. 5 is a granite composition, No. 6 is Hawaiian lava and composition No. 7 was obtained from the Aluminum Co. of America.

In making the tests, the kiln was modified to permit tilting and to provide a mold box opening into the inside of the kiln so that the sample could be introduced into the mold box and pressed under uniform pressure for all samples at controlled temperatures. The weight of each dry sample was kept constant so that it would form a spherical log and would fit inside the rectangular mold box. The molding pressure (50 p.s.i.) was kept constant by a slip clutch on the driving motor providing the pressing power. Temperatures of the kiln and sample were accurately read by an optical pyrometer as was the temperature of the mold box parts. The metal (Hastelloy-X) mold box, top and bottom were kept below 1600° F. the "temperature of adherence" so the hot material would not stick to the mold surfaces. In each instance other than when a blank was made for comparative purposes, the constant weight sample was heated past incipient fusion until a poorly defined ball was formed and it was then dusted with parting material. Each type of material was tested at various temperatures using different samples to determine the time required for pressing the spherical ball introduced into the mold box into a rectangular shape conforming to that of the mold box. The pressing mechanism was constructed so that the clutch on the drive motor gave a warning sound when the sample was completely pressed and conformed to the shape of the mold box.

Preliminary tests were run to predetermine the weight of each material required to produce a ball of the same size. The temperature of the mold parts was regulated by forced air from blowers. The parting material used was ordinary ocean beach sand and ordinary river sand in particle sizes passing a 16 mesh screen. This material is at least 200° F. more refractory than the primary material of the samples. The parting material was allowed to sift down onto the kiln lining surface in the path of travel of the rolling ball or log so that the coating was first applied to the kiln lining surface and then picked up by the ball or log as the latter rolled in the revolving kiln.

The raw primary material was heated to a point where the particles were heat softened (pyroplastic) and the outside surface of each granule became just wet enough (fusion) to become sticky on the outside, although dry inside, and agglomerate the mass into a rough ball of uneven density that could be rolled by the tilting of the kiln into the opening of the rectangular mold box. The temperature range for the runs varied from 1900° F. to 2350° F. overall. The heating time varied with each type of material and was generally less than an hour.

One of the chief purposes of the tests was to measure the effect on plasticity of the different materials caused by coating the hot primary materials with the parting material. Plasticity is a function of the property of the material to be forged, molded, etc., into products. Plasticity is, of course, a criterium for other desired properties of the material for forming it into finished products. In order to measure this effect, pressing times, that is time required to press the ball to conform to the mold, were measured for balls of each material, first uncoated and second coated with parting material. When the ball of hot material was formed, either coated or uncoated, the rotating kiln was tilted to project the ball into the mold box which is integral with the rotating kiln. Power was then applied to force the mold lid down into the mold box to squeeze the sphere against the mold bottom. The time required to squeeze the sphere to conform to the rectangular brick shape of the molding box was measured as an indicium of plasticity.

Example 1

The measured amount of material of sample 1 was heated in the klin for 30 minutes to bring the temperature from room temperature to 2190° F. at which point the particles agglomerated into a rough ball of uneven density showing voids in the surface and rolling unevenly due to its being an imperfect sphere. This ball, which was unsanded, was sticky on its surface and left a constant stream of particles sticking to the kiln surface. The ball was propelled into the mold box by tilting the kiln, and power was then applied from the pressing mechanism. Eight seconds of pressing time were required to press the ball into complete conformance with the rectangular shape of the mold box. The ball was ejected by means of the movable bottom of the mold box to the outside area to be cooled.

The procedure of the above example was repeated with another measured amount of the material from clay sample No. 1. Upon the formation of a rough ball at 2190° F., granular sand powder was sifted onto the kiln surface in front of the rotating ball by means of the screw conveyor. The outer sticky surface of the ball was completely coated by the sand on the kiln surface. The sand coated ball was maintained at 2190° F. and allowed to roll on the kiln surface for three revolutions before being propelled into the mold box. During its three revolutions the sanded ball picked up the granules of clay which had been deposited on the kiln surface by the previous ball which had not been sanded. The sanded ball cleaned the kiln surface to a reasonable degree of cleanliness which was visible to the eye. Upon entry of the sanded ball into the mold box, pressing power was applied and the sphere was conformed to the rectangular brick shape of the mold box in four seconds. This illustrated that the coating by the parting material increased the plasticity of mass of the ball. It was observed that the sanding caused the ball to become more bloated with gases than it had been before at the same temperature. Other tests on the same material performed without pressing showed that with a 50° F. increase in temperature after sanding, the bloating action was more than doubled due to sanding of the ball. By holding the temperature at 2190° F. the increase in bloating of the ball was not great enough to prevent the ball from entering the mold box.

Another sample of the same material of half the weight of the above two samples was treated by the same procedure of heating and sanding at 2100° F. but was permitted to rotate in the kiln for an additional 15 minutes until the temperature reached 2300° F, the approximate liquid fusion temperature of the primary material. The shape of the ball became more definite and was that of a cylindrical log with spherical ends. The material did not become liquid but had a definite shape. The surface of the log was smooth and had no voids or holes in it. No material was deposited on the kiln surfaces. Upon pressing in the mold box the log conformed to the rectangular shape of the mold box in two seconds even though the log entered the mold box in a vertical relationship to the bottom of the box. After ejection and cooling, a sawed section of the rectangular product showed the individual clay granules as separate entities in the homogeneous mass and that there had been no liquid mixing of the granules or loss of identity. The above test would be impossible to duplicate at 2300° F. by conventional methods without application of the parting material, as the clay mass would stick to the kiln surfaces at 2190° F. and above.

The use of parting material provides a wider temperature range of operation so that any degree of plasticity can be obtained by using higher temperatures than are ordinarily possible by conventional methods. The abrupt increase in plasticity achieved by sanding indicates that the coating gives more plasticity to the mass of primary material than would ordinarily be available, even if it were possible to raise the temperature of the clay to 2300° F. without its sticking and forming a coating on the kiln surface.

The procedure used in performing the tests described in the above example was used in all of the following examples.

Example 2

Using a measured amount of material from sample No. 2 the initial "balling" temperature was 2095° F. The coated and uncoated balls at this temperature required pressing times of 7.5 seconds and 3.8 seconds, respectively. The pressing time of the coated ball-log after heating to 2300° F. was 1.8 seconds and after heating to 2500° F. was 2.2 seconds.

Example 3

Using a weighed amount of material from sample 3, the initial balling temperature was 2100° F. The uncoated and coated balls at this temperature required pressing times of 8.2 and 4.2 seconds, respectively. After heating to 2300° F. the coated log required a pressing time of 2.1 seconds.

Example 4

The initial balling temperature for a measured amount of sample 4 was 2160° F. Pressing time for uncoated and coated balls at this temperature was 7.8 and 3.9 seconds, respectively. After heating the coated ball-log to 2300° F. the pressing time was 1.8 seconds.

Example 5

Using a measured amount of sample No. 5 (granite-igneous) the initial balling temperature was found to be 2310° F. Pressing times for the uncoated and coated ball at this temperature were 12 and 7.6 seconds, respectively. After the coated ball-log had been heated to 2500° F., its approximate liquid fusion temperature, a pressing time of 3.7 seconds was required. Except for the lack of bloating there was little difference in the behavior of the material of this sample and that of sample No. 1.

Example 6

Using a measured amount of material from sample No. 6 (lava-igneous) the initial balling temperature was found to be 1980° F. Pressing times for the uncoated and coated ball at this temperature were 9 seconds and 4.2 seconds, respectively. After heating the ball-log at 2300° F., its approximate liquid fusion temperature, the pressing time was 1.6 seconds. Except for the lacking of bloating, there was little difference in the behavior of material of this sample and that from sample No. 1. The raw, uncontaminated lava contained millions of small bubbles (unconnected to each other) that were volcanic gases at the time the lava was produced. During heating of the kiln the one-fourth inch to one-sixteenth inch size particles lost at least 80% of these bubbles resulting in a mass more dense than at the beginning. No additional gases were evolved. The resulting product, after pressing, resembled basalt instead of lava.

Example 7

Using a measured amount of material from sample 7, furnace clay (igneous-slag), the initial balling temperature was found to be 2210° F. Pressing times for the uncoated ball and the coated ball at this temperature were 11 seconds and 6.2 seconds, respectively. After heating the coated ball-log at 2500° F., its approximate liquid fusion temperature, 1.4 seconds pressing time was required.

Except for the absence of bloating, there was little difference in the behavior of the materials from samples 5, 6 and 7 from the behavior of material from sample 1. The slag started as a dense material and remained dense throughout the test. At the beginning, the slag had the appearance of black glass and after the test the product had the appearance of black clay, showing that the iron content of the slag had been modified by the sanding, heating in a neutral atmosphere, and pressing into a product.

All of the examples graphically illustrate that the plasticity of the primary material was significantly increased by the use of the parting material. Furthermore, the quality of the log formed by use of the parting material was significantly increased as illustrated by the fact that it was smooth, of uniform density, and contained no holes in the outer surface. Additionally, the time required to perform the firing operation with the use of the parting material was ordinarily less than an hour. This is in contrast to prior art methods in which time is measured in days rather than hours. Even three hours is considered a short time in conventional ceramic firing.

Figure 10:
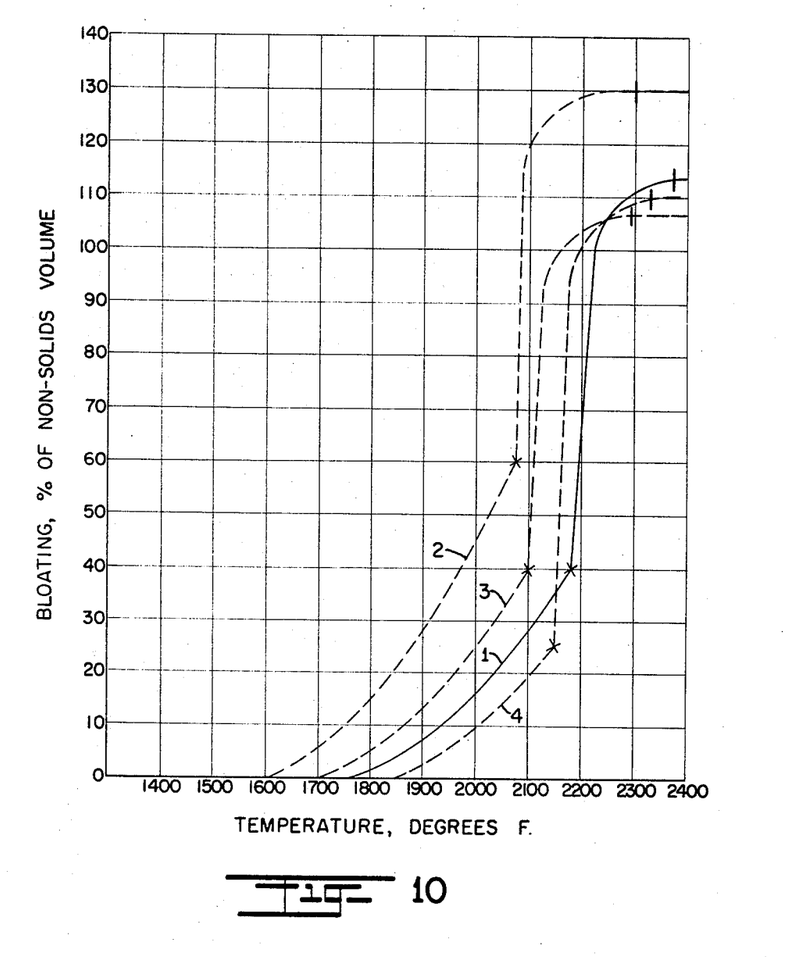
FIG. 10 is a plot of temperature against percent of non-solids volume for argillaceous materials fired in accordance with the method of the invention.

The graph of FIG. 10 was made by plotting temperature in degrees Fahrenheit against percent bloating for samples 1–4, inclusive, of Table 1, these materials all being argillaceous materials. The asterisks on the curves represent the temperature at which the parting material was applied and the short vertical lines at the top of the curves indicate the point where bloating ceased or the point of complete bloating and liquid fusion. In each case, the coating powder was applied at a few degrees (10 to 20 degrees F.) above the highest temperature that each material could be heated for conventional, lightweight aggregate, that is, slightly above the incipient dry fusion temperature. This was the point at which the primary material became sticky enough to form little isolated ball-masses and threatened to either form large balls or stick to the sides of the rotating kiln.

In the case of each primary argillaceous material, the curve shows a remarkable increase in bloating all within a few degrees of temperature rise. The abrupt rise in bloating would undoubtedly be instantaneous if it were not for the natural viscosity of the hot clays acting to hold back the physical expansion of the material in the form of a rolling log. This abrupt bloating requires from 1 to 5 minutes and permits the kiln to further heat the material.

From the curves it is apparent that all the bloating occurred above the temperature at which the parting material was applied, that is, the highest temperature to which primary material could be heated in the past to make lightweight aggregate. This represents an increased bloating over that which could be accomplished by prior art methods.

Inasmuch as the final temperature for each material was several hundred degrees F. above that to which the material can be heated in the kiln in conventional lightweight aggregate manufacture, it is obvious that every granule of the primary argillaceous material was thoroughly fired and absolutely no degree of underfired quality could exist. Bloating does not start until the dry incipient fusion point and because of the short bloating range between dry incipient fusion and wet fusion when sticky material must be removed from the kiln, there is insufficient time for complete bloating. If the material is heated to the liquid fusion point all gases are expelled, resulting in a dense product which will not float or be satisfactory for lightweight commercial products.

A hot mold does not compress the gas too much but if there is considerable compression, rebloating can ocur after release of molding pressure. Accordingly, a cool mold about 500° F. or more below the temperature of liquid fusion, that is the temperature at which normal bloating occurs, is preferred.

It was found that igneous and igneous-slags form a very similar log, with practically no bloating and only a few trapped air pockets. Logs from these materials are as soft as are the logs of argillaceous material and could also be forged with a 16 lb. hammer without shattering.

Parting materials of various colors, such as pink granite matter, can be used to make an attractive finish. Similar results were obtained for the igneous and slag materials as those obtained for argillaceous materials, the only essential difference being that these materials do not bloat as do the argillaceous materials. As the igneous and slag-like materials have been subjected to high heat conditions in nature they contain very little gas or gas forming materials as do the argillaceous clay materials.

It can be seen from the above examples and the chart of FIG. 10, that a reproducible method has been provided for insuring complete bloating of argillaceous materials. After the coating or parting material has been applied to the log, the temperature can be raised past the point of maximum bloating to guarantee that every brick, block or other product is fully bloated. After the maximum bloating factor of any material has been determined in the laboratory, no exact control is necessary to give 100% bloating for every product. This insures that bricks which float can be consistently produced from argillaceous materials. If igneous and igneous-like slags have become contaminated with foreign gas forming matter they too will bloat like argillaceous materials.

The igneous and igneous-like slags go through the same sticky stage as the argillaceous materials while being heated in the rotating kiln and have the same tendency to form balls or stick to the surfaces of the kiln. As disclosed above, when the granular parting material is applied at this stage these igneous and igneous-like slag materials form logs just like the argillaceous materials. The only difference between the logs of igneous and igneous-like slag on the one hand and the logs of argillaceous material on the other hand is that the latter contain gas and the former ordinarily contain almost no gas. However, in the liquid fusion region the logs of all materials act the same so far as forging, molding or otherwise deforming is concerned.

The igneous and igneous-like slag materials form dense nonfloating bricks of structural quality. It was observed that much of the gas is lost from the igneous and igneous-like slag materials during tumbling in the kiln before final heating. If a product formed from igneous or igneous-like slags in accordance with the method of this invention is chipped or broken, the characteristic concoidal fracture of basalt can be seen, even in the case where the original granules were of Hawaiian lava. By adjustment of the atmosphere in the kiln from neutral to oxidizing or to reducing, the characteristics of the igneous and igneous-like slag is changed due to the change of state of the iron in the material.

As the igneous and igneous-like slags contain little or no gas, this material is excellent for making very thin floor tiles and wall tiles wherein the finished surface must be flat. The greater density and weight is an asset in floor tiles as the strength of the product is greatly increased.

With any of the forging units used to make products from the log, the products emerge at a temperature that is high enough to melt a glaze powder on any surface. This permits the ready formation of a glazed surface. The glaze powder is sifted or blown on the product and when it comes in contact with the product it adheres and melts immediately. In cases where a ceramic glaze is not required to color the forged products the parting material or coating powder may be the color finish for the product. For example, material from Example 5 may be used to coat the log of material from Example 2 or 3. Also, different colored sands may be used, or a combination of sands and special ceramic enamels now used to make sand face conventional bricks may be used. There are many combinations which may be used for providing a color finish to a product as required.

It appeared that every granule of the primary material from which the logs were made was thoroughly fired. It is a characteristic of fired ceramic materials that a difference in shade occurs between the completely fired and the less fired areas. Photos are used in the trade journals showing the shade gradations from the exterior of a brick to the interior thereof to show the degree of firing. The color shades observed in the products of the examples showed that the primary material was completely fired. Even though the granules were of different composition clays, or igneous, and had a different color in relation to the general mass, each granule had a perfectly uniform color shade throughout its mass. The uniformity of fired color-shade denotes uniformity of firing throughout the mass of each granule. Also, in the general mass, a light-colored granule near the surface of the product had exactly the same intensity of light color as the light-colored granule near the center of the product, even though there were different colored granules of different compositions throughout the product mass. This denotes uniformity of firing throughout the product.

It is seen from the above description of the operation and results of the invention that numerous advantages flow therefrom.

A method has been provided which permits the forging of agglomerated granules at the upper temperature limit used in conventional construction aggregate practice. The method provides a procedure by which primary material can be heated in the kiln to the liquid fusion state under conditions avoiding its sticking to the sides of the kiln. The method provides a means for forging the log product formed into all types of commercial end products. It provides a method which is applicable to argillaceous, igneous, igneous-like slag and other materials to form a product containing substantially no unfired primary material and of which the individual particles of material retain their identity. The method insures that the fines are agglomerated into the final product and insures the formation of sound aggregate in large sizes. The method has high economic advantages because it can be conducted in a comparatively short time without the use of excessively high temperatures. It insures complete bloating of the primary material so that no rebloating occurs during molding, forging, etc. It insures that substantially all of the gases of bloating, particularly in the case of argillaceous materials, are retained in the final product. The method insures that products which float in water can be obtained by firing argillaceous and other gas containing materials. It is a further advantage of the method that it provides a procedure for firing primary material at its liquid fusion temperature in the kiln and later converting it into a finished product, without the use of many of the expedients of the prior art, such as the use of pressures and confined gases in the mold to convert the material to the liquid fusion state in the mold.

Accordingly, while the disclosed form of method constitutes a preferred embodiment of the present invention, it is to be understood that the invention is not limited to this precise form of method and that various changes and modifications may be made therein without departing from the scope of the invention as defined in the appended claims.

What is claimed is:

1. A method of forming a product from primary siliceous material which comprises:
    (a) introducing said primary material in particulate form into a rotating kiln,
    (b) heating the primary material to about its wet fusion temperature,
    (c) tumbling the heated material to achieve agglomeration,
    (d) forming the agglomerates into a unified mass having an elongated cylindrical shape,
    (e) coating said unified mass with a particulate refractory material having a liquid fusion temperature above that of said primary material,
    (f) heating said coated unified mass to a temperature above the wet fusion temperature of said primary material,
    (g) rolling said unified mass into a final cylindrical configuration.

2. The method of claim 1 in which said primary siliceous material is a material selected from the group consisting of argillaceous and igneous materials, and mixtures thereof.

3. The method of claim 1 in which said refractory material is of a material selected from the group consisting of quartz, sand, granite, bauxite and sandy loam.

4. The method of claim 1 in which step (e) of claim 1 is performed with a particulate refractory material having a liquid fusion temperature about 150° F. above that of said primary material.

5. The method of claim 4 including the step of rolling said coated unified mass between rollers and the interior surface of said kiln to form said cylindrical configuration.

6. The method of claim 4 in which said primary material, prior to introduction of said particulate refractory material into the kiln, is heated in a first heating zone within said kiln to one temperature to render said primary material tacky and then said primary material is transferred from said first zone into a second and final heating zone at a substantially higher temperature than that of said first zone.

7. In the method of forming products from a primary material selected from the group consisting of argillaceous and igneous materials, and mixtures thereof, which method comprises introducing said primary material into a rotating kiln, heating said primary material to its wet fusion temperature while tumbling, agglomerating and forming said primary material into a cylindrical mass followed by removing the mass from the kiln and forming it into products; the improvement which comprises:
    (a) coating said cylindrical mass with a coating of particulate refractory material having a liquid fusion temperature higher than that of said primary material,
    (b) heating said coated cylindrical mass to a point at least slightly below its liquid fusion temperature,
    (c) rolling said coated cylindrical mass into a final cylindrical configuration.

8. A method for making an intermediate product from a primary material selected from the group consisting of argillaceous and igneous materials, and mixtures thereof, which comprises:
    (a) introducing said primary material in particulate form into a rotating kiln,
    (b) heating said primary material to its wet fusion temperature,
    (c) tumbling said heated primary material to achieve agglomeration,
    (d) forming the agglomerates into a unified mass,
    (e) distributing on the interior wall of said kiln in the path of said unified mass a particulate refractory material having a liquid fusion temperature about 200° F. above that of said primary material to coat said unified mass,
(f) heating said coated unified mass to at least the liquid fusion temperature of said primary material,
(g) forming said coated unified mass into a cylindrical product,
(h) removing said cylindrical product from said kiln.

9. The method of claim 8 in which said primary material during step (e) of claim 8 is rolled between rollers and the interior wall of said kiln to form said primary material into said cylindrical product before said product is removed from the kiln.

No references cited.

ROBERT F. WHITE, *Primary Examiner.*

J. R. HALL, *Assistant Examiner.*